Jan. 26, 1937.  H. C. A. BEHR ET AL  2,069,192
AUTOMATIC ROASTER
Filed Jan. 29, 1936  2 Sheets-Sheet 1

Inventors,
HARRY C. A. BEHR
AND JULES J. ECK.

By E. E. Vrooman & Co.,
Their Attorneys.

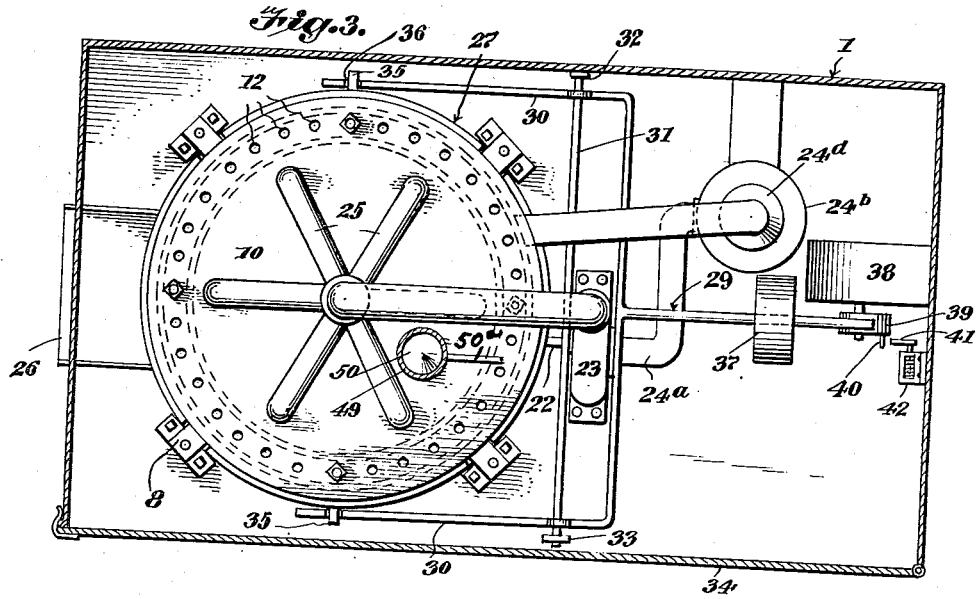

Patented Jan. 26, 1937

2,069,192

UNITED STATES PATENT OFFICE 2,069,192

AUTOMATIC ROASTER

Harry C. A. Behr and Jules J. Eck, York, Pa., assignors to Yorktown Electric Roaster Manufacturing Corporation, York, Pa., a corporation of Pennsylvania Application January 29, 1936, Serial No. 61,386

4 Claims. (Cl. 34—34)

This invention relates to an automatic roaster for roasting different foods, such as coffee, peanuts and the like.

An object of this invention is the construction of a simple and efficient roaster of an upright or vertical type.

Another object of our invention is the construction of an efficient roaster which can be easily installed in a store or building for handling automatically, preferably small quantities of food such, for instance, as five pounds of coffee at a time.

A further object of our invention is the construction of a "vertical type" of roaster, in which the foods or goods, such as coffee, can be automatically deposited, accurately roasted and automatically discharged, in predetermined quantities.

A still further object of the invention is the construction of a roaster particularly adapted for efficiently handling coffee in stores, whereby the customer can be quickly and efficiently supplied with strictly fresh-roasted coffee in a minimum amount of time.

With the foregoing and other objects in view, our invention comprises certain novel constructions, combinations and arrangements of parts as will be hereinafter fully described, illustrated in the accompanying drawings, and more particularly pointed out in the appended claims.

In the drawings:

Figure 3 is a horizontal sectional view taken on line 3—3, Figure 1 and looking in the direction of the arrows.

Figure 4 is a horizontal sectional view taken on line 4—4, Figure 1, and looking in the direction of the arrows.

Figure 5 is an enlarged fragmentary sectional view showing in elevation one of the heating elements or units.

Figure 6 is an enlarged sectional view taken on line 6—6, Figure 4, and looking in the direction of the arrows.

Figure 7 is a view partly in vertical section and partly in elevation of the charging hopper.

Figure 8 is a sectional view taken on line 8—8, Figure 7, showing the two cams of the timing mechanism.

Figure 1:
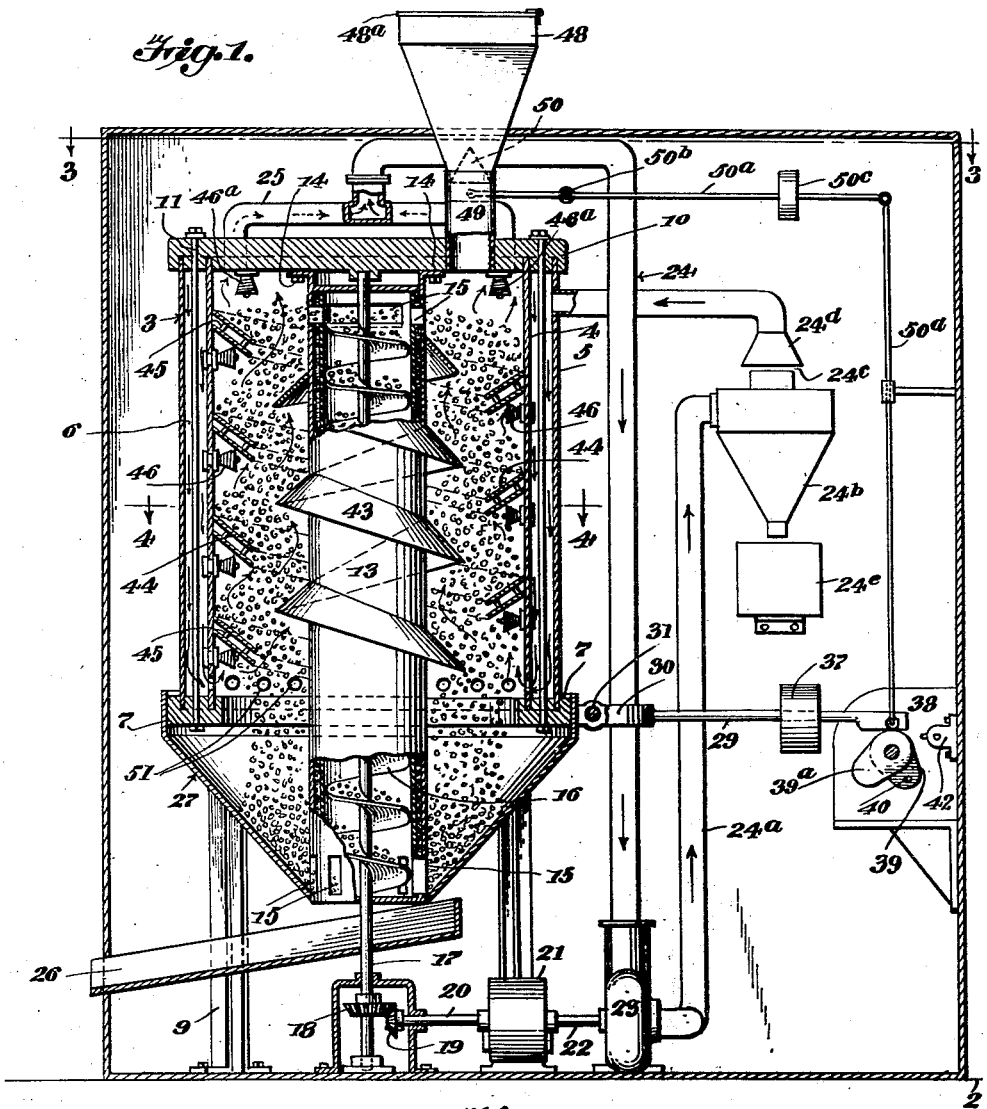
Figure 1 is a view partly in elevation and partly in vertical central section of an apparatus constructed in accordance with the present invention.

In the following description of the invention, for simplicity, "coffee" is specifically referred to as the food to be roasted, but other foods, such as peanuts, can be excellently roasted. Therefore, "coffee" is used as a broad term, designating any foods of like nature to be handled by our roaster. Further, in the drawings, we have shown one, and preferably the preferred embodiment of the invention, in which 1 designates a suitable enclosing casing that is adapted to rest or be positioned upon any suitable support 2, Fig. 1.

Within the enclosing casing 1 is positioned a sectional container 3, which comprises an inner shell 4 and an outer shell 5. These shells are obviously spaced apart, producing therebetween a fresh air conduit 6 for the purpose hereinafter described. The lower ends of the sectional container 3 are preferably seated in a ring-like bottom 7 (Fig 1). This bottom 7 is preferably provided with outstanding lugs or extensions 8 which are suitably attached to the top of standards or legs 9, Fig. 6. These legs 9 are suitably secured to the bottom of the enclosing casing 1. A cap or top 10 is mounted on the upper ends of shells 4 and 5, with the same extending into the top, similar to the manner in which they extend into the bottom 7. Stay bolts 11 extend through top 10 and bottom 7, between shells 4 and 5, thereby securing the sectional container 3 efficiently with the top and bottom of the apparatus. In the top 10 are a plurality of air inlet apertures 12 (Fig. 3), so that air can be drawn into the conduit 6 from preferably within the enclosing casing 1.

A sectional conveyor casing 13 is secured at 14 against the inner face of top 10. This conveyor casing 13 comprises an inner shell 13a and an outer shell 13b, Figs. 1 and 4. Between these shells 13a and 13b the constructor, if he so desires, may place any suitable insulating material. By reason of this structure of the conveyor casing 13 the oily substance in the coffee will not be destroyed, nor will what is technically known as nipping the beans occur. Other advantages are obtained by this novel construction of the conveyor casing 13.

The conveyor casing 13 is provided in its shells 13a and 13b, near their upper end, with registering discharge openings or apertures 15 for allowing coffee that has been elevated from the bottom of the container to be discharged into the top of the container. The bottom of the sectional conveyor casing 13 is closed, with registering elongated openings or apertures 15a (Fig. 2) formed just above its closed end, for allowing the coffee to pass into the conveyor casing 13 and thence, through the medium of the screw conveyor 16, be elevated to the top of the casing 13 and discharged out through said apertures 15. This conveyor 16 is provided with a drive shaft 17 that has a suitable gear 18 fixedly secured in any common manner thereto. Gear 18 meshes with a similar gear 19, which gear 19 is fixedly secured in any common manner to shaft 20 of any preferred type of motor 21. Motor 21 through shaft 22 is attached to a suction fan at 23, whereby air is drawn through air conduit 24 and its branches 25 from within the sectional container 3. The outer ends of branches 25 open into the sectional container 3 through top 10. Through the medium of a conduit 24a fan 23 is connected to a dust collector 24b. There is an open space 24c at the top of the chaff or dust collector 24b and directly above this space or opening 24c is a hood 24d, into which hood will flow the separated heated air and the air will be returned to the space between the shells of the sectional container 3, as clearly seen in Fig. 1. The reasons for this return of the air are twofold, to-wit, first it will allow for a considerable saving in heat losses, and it will reduce the time limit for roasting; it is, however, our intention to mix a predetermined portion of fresh air with this heated air to obtain the right amount of mixture. Second, and a very important factor, is that none of the commercial roasters heretofore have been able to save the expelled aroma during roasting; these aromas are highly volatile and it is logical that if they could be returned into the roasting process, these volatile matters would mix and increase the intrinsic value of the coffee due to the added aroma, which we believe to have always been heretofore expelled. Again it is the custom with all commercial coffee roasters to water the coffee after roasting, for quick cooling and to increase the weight of the charge; however in our improved method we return a partly saturated air, and what we believe is of great importance, our shrinkage will be considerably less than if we would entertain to throw the excess air entirely out into the outer atmosphere, using only cold air, which we do not. Under the chaff or dust collector 24b is a suitable bin 24e.

We provide a novel valve structure preferably on the bottom of the sectional container 3 for automatically discharging predetermined quantities of roasted coffee into chute 26. This valve structure comprises a hopper-like valve casing 27, which is provided with a lower open end 28 (Fig. 2) which end 28 is of the same size as the lower end of the conveyor casing 13. Therefore, when the valve casing is in its closed position, as shown in Fig. 1, no coffee can be discharged into chute 26. In its closed position, the upper portion or edge of the valve casing 27 extends up around the bottom 7, thereby efficiently closing the container against any discharge of the food or air being roasted therein. A lever 29 (Fig. 3) is provided with parallel side arms 30. These arms 30 are pivotally mounted upon a supporting rod 31. At one end 32, said rod 31 is supported upon the enclosing casing 1, while the opposite end is suitably supported at 33 within the casing, adjacent to the hinged side or door 34 (Fig. 3) of the enclosing casing. At opposite sides of the valve casing 27 are lug-like ears 35; these ears rest in notches 36 of arms 30, whereby the lever and the valve casing are pivotally or movably connected together.

An adjustable weight 37 is mounted upon lever 29. By means of this weight, the operator can easily and accurately control the true balancing of the valve casing upon the lever, whereby the valve casing normally is tightly retained in its closed position. A timing or clock unit 38 is provided with a cam 39; this cam 39 is preferably under the outer end of lever 29, so that at predetermined intervals the cam 39 will move, as clearly shown in Figure 2, to raise the outer end of lever 29, for lowering the valve casing 27 whereby the roasted coffee in the container 3 will be quickly discharged or deposited into chute 26.

The cam 39 is provided preferably with a pin 40 that contacts at each revolution with a suitable trip 41 (Fig. 3) of a recording unit 42. Therefore, it will be seen that we have provided means for accurately discharging roasted coffee at predetermined timed intervals. Also that we have provided simple means for accurately recording the quantity of roasted coffee handled by the apparatus.

On the outside of the conveyor casing 13, we suitably secure a spiral deflector 43. Secured to the inner face of the inner shell 4 of the sectional container 3 is a double deck spiral deflector 44; this deflector 44 is made up of two plates spaced apart by spacing elements 45, Fig. 1. Contiguous to and directly underneath the double deck spiral deflector 44 are a plurality of heating units 46 (Figs. 1 and 5). These heating units 46 are suitably mounted upon the inner shell 4 and are connected to any suitable source of electricity by cables or wires 47. These heating units 46 are protected by deflector 44. These deflectors 43 and 44 serve the purpose of protecting the coffee to be roasted from burning during its passage from top to bottom in the heating chamber. At the top of the container 3 are preferably spaced heating units 46a.

For supplying the coffee, or like foods, to the container 3, we place an inlet hopper 48 (with a tightly fitting cover 48a thereon) above the container with a tube 49 extending through the top 10. A valve 50 cooperates with the hopper 48 to normally close the same. This valve 50 is mounted on a suitable rod 50a which rod is pivotally mounted at 50b upon the inclosing casing (Fig. 1). On rod 50a is a weight 50c. The outer end of rod 50a is pivotally connected to a suitable vertical rod 50d that engages cam 39a of the timing mechanism 38. This charging hopper, constituted by the units 48 and 50, with their cooperating parts, has several functions, to-wit first, and most important it allows or admits only a predetermined amount of coffee and it prevents overcharging the roaster. Second, it absolutely prevents the escape of gases, aroma or air; it is an automatic seal in every respect. Therefore it is to be understood that our apparatus specifically involves an accurate, timed valve means at the top of the container for supplying foods thereto, whereas at the bottom of the container we also provide an accurate, timed valve means for discharging the roasted foods from the container.

It is to be noted that in Figure 3 we have not shown in top plan the entire rod 50a, nor weight 50c because these features are fully illustrated in Figs. 1, 7 and 8.

Near the lower end of the inner shell 4 are provided inlet fresh air apertures 51, whereby the air will be freely sucked from conduit 6 into the container through the action of the suction fan at 23. If it is desired, part of the aromatic air handled by fan 23 can be discharged by any suitable means into the enclosing casing 1, part into the store and part into a suitable flue (not shown). The portion of the air discharged into a store will be pleasing to the prospective customers and will, consequently, excite their interest in the food being roasted.

By reason of our improved vertical type roaster, the coffee is perfectly roasted, with no loss of profitable weight occurring, as hereinbefore explained.

The heated deflector 44 is sufficient for producing the amount of heat in the container for roasting the coffee, since the hot air is caused to pass by the deflectors in an agitated condition, the same as the coffee is agitated, indicated by arrow in Fig. 1.

Figure 2:
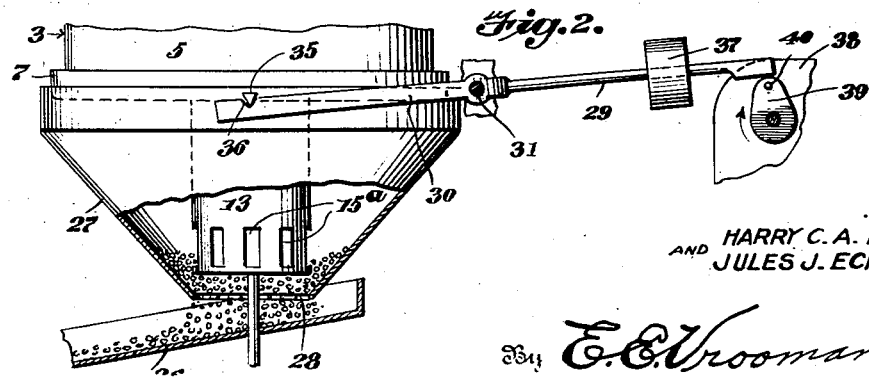
Figure 2 is a fragmentary view, partly in elevation and partly in section, showing particularly the lower valved end of the apparatus.

When the time-controlled lever means 29 is operated for opening the valve means (constituted by casing 27, etc. Fig. 2) the container 3 will be emptied of the roasted food, such as coffee, and thence upon the valve being closed on the container 3 the time-controlled cam 39a will actuate rods 50d, 50a and movable valve 50 for causing a new supply of coffee to be automatically discharged into the sectional container 3, as hereinbefore specified. In this manner, truly fresh roasted coffee can be easily furnished purchasers in a few minutes' time, since our apparatus is admirable for installation in stores, such as food stores and the like. No unsatisfactory delays in shipment of roasted coffee will be involved by the use of our apparatus in the store. Our roasted product is supplied the trade with all of its rich flavor retained, and no undue loss in weight.

While we have described the preferred embodiment of our invention and illustrated the same in the accompanying drawings, certain minor changes or alterations may appear to one skilled in the art to which this invention relates during the extensive manufacture of the same, and we, therefore, reserve the right to make such changes or alterations as shall fairly fall within the scope of the appended claims.

What we claim is:

1. In an apparatus of the class described, the combination of a container, a vertical conveyor casing in said container, said conveyor casing provided with a spiral deflector fixedly secured to its outside, said conveyor casing provided with horizontal inlet apertures at its lower end and horizontal outlet apertures at its upper end, conveyor means in said conveyor casing for elevating foods and discharging the same through said outlet apertures onto said spiral deflector, means for discharging foods from the lower end of said container, and means at the top of said container for supplying foods thereto.

2. In an apparatus of the class described, the combination of a container having an open bottom, a conveyor casing provided with a conveyor extending down through said open bottom, a vertically movable valve casing having an open bottom normally closing around the bottom of said conveyor casing with its upper end around a portion of said container, and means for operating said movable valve casing for moving the same downwardly away from said conveyor casing and into an "open" discharging position.

3. In an apparatus of the class described, the combination of a container provided with an open bottom, a conveyor casing extending into said container and also through said open bottom and below the container, a hopper-like valve casing vertically-movable and open at its bottom, said open bottom of the valve casing corresponding to the size of the bottom of said conveyor casing and normally closing around the same with the upper end of said valve casing around a portion of said container, and means for moving the valve casing to open and closed position.

4. In an apparatus of the class described, the combination of a container, a movably mounted lever provided with parallel arms, said arms positioned upon opposite sides of said container and provided with notches, a valve casing around a portion of said container and provided with oppositely extending ears, said ears seated in said notches, weight means on said lever, and time-controlled means co-operating with said lever for actuating the same.

HARRY C. A. BEHR.
JULES J. ECK.